Jan. 21, 1964  J. W. KAPPEN  3,118,684
NESTING FOUR WHEEL TRUCK
Filed Aug. 11, 1959  2 Sheets-Sheet 1
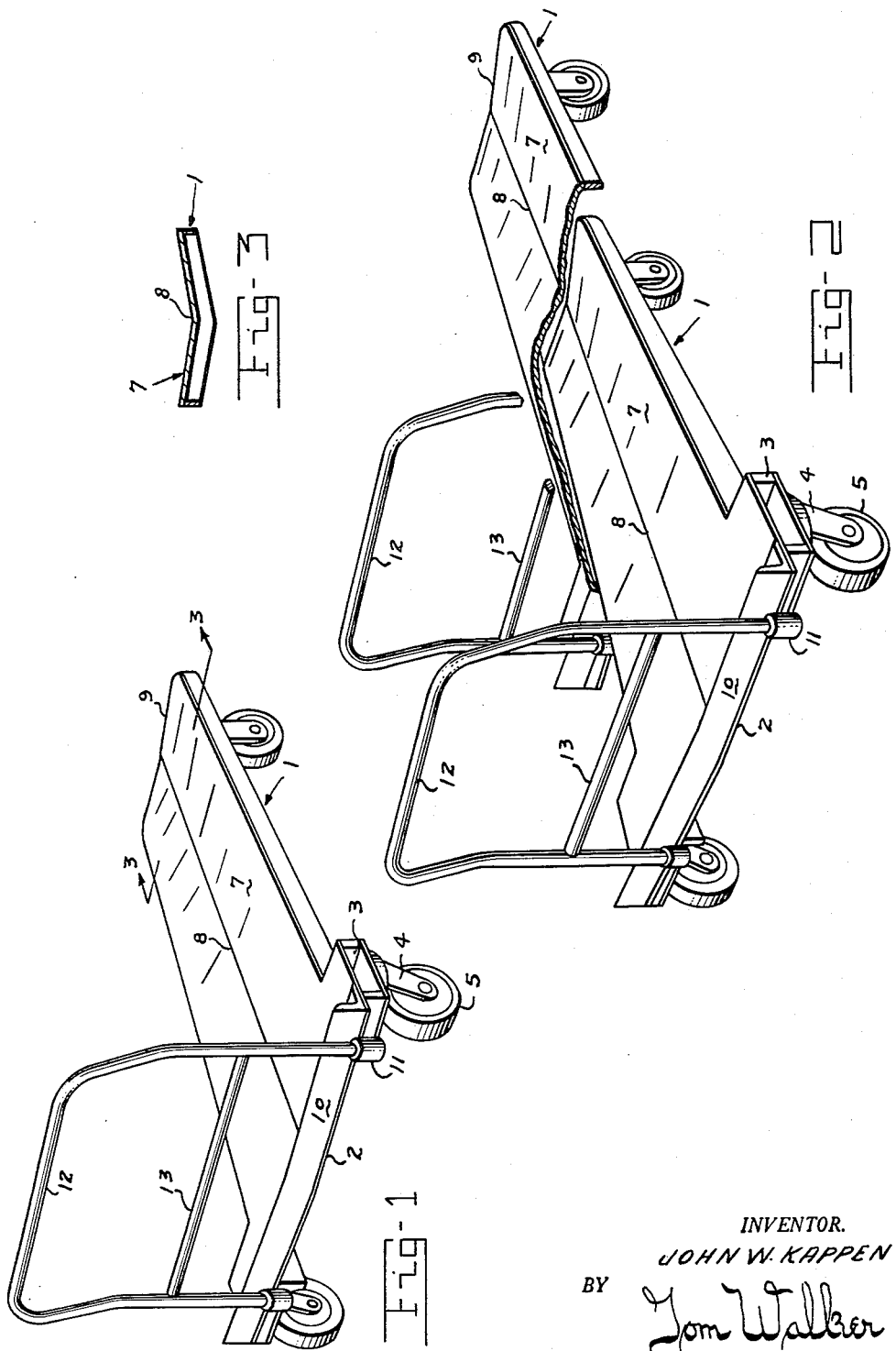
INVENTOR.
JOHN W. KAPPEN
BY Tom Walker
ATTORNEY Jan. 21, 1964 J. W. KAPPEN 3,118,684
NESTING FOUR WHEEL TRUCK
Filed Aug. 11, 1959 2 Sheets-Sheet 2
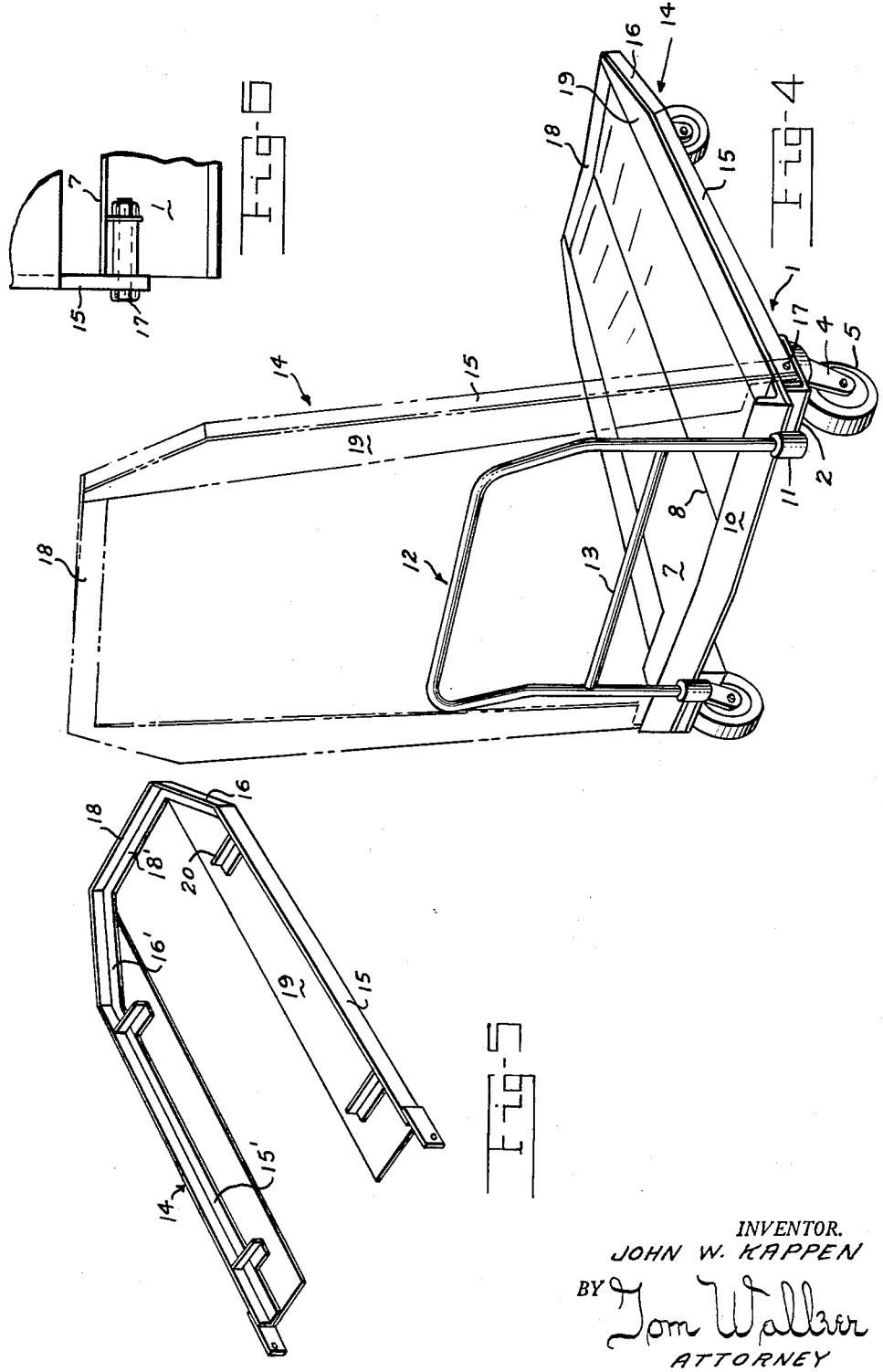
INVENTOR.
JOHN W. KAPPEN
BY Tom Walker
ATTORNEY

United States Patent Office 3,118,684
Patented Jan. 21, 1964

3,118,684
NESTING FOUR WHEEL TRUCK
John W. Kappen, 243 Kenwood Ave., Dayton, Ohio
Filed Aug. 11, 1959, Ser. No. 832,997
7 Claims. (Cl. 280—33.99)

This invention relates to hand trucks and more particularly to improvements in platform type hand trucks such as are commonly used in warehouse operations. Reference is made to copending application, Serial No. 634,589, filed January 16, 1957, now abandoned, this application being a continuation-in-part thereof.

Platform type hand trucks are essential to warehouse operations. For example, in grocery warehouses orders for delivery to a particular store are individually piled on four wheel trucks, bodily moved to loading docks and onto trailers for shipment along with similar orders for other stores. As the trailers stop at each store, appropriate trucks are rolled off and left to be unloaded. The trailers must return to pick up the empty trucks. Each trailer has limited capacity and can only accommodate a certain number of loaded trucks whether the orders on the trucks be large or small. Since conventional platform type trucks cannot be readily stacked or nested, it requires as many trailers to pick up the empty trucks as it does to deliver the loaded trucks. This is an involved and expensive operation but quite necessary since the platform type hand truck is peculiarly convenient for the movement of the merchandise.

It will be recognized that a considerable number of these trucks are necessary for such a warehousing operation. Therefore, their cost from the standpoint of capital investment is a matter of primary concern. Also, since the conventional platform type hand truck is limited in capacity, takes up considerable space, and is relatively inflexible in use, other factors present themselves indicating a need for improvements therein. While efforts have been made to render the platform type hand truck more versatile and adaptable for various applications, such efforts have generally lent complexity to the truck structure, increased its cost and created problems related to its handling and maintenance.

The present invention provides simple but highly advantageous improvements in platform type hand trucks producing substantial economies in warehousing operations. Trucks in accordance with the invention are more adaptable to meet the requirements of various loads, provide more secure positioning of merchandise thereon and afford a simple nesting thereof when empty. In addition these improved trucks are relatively economical to fabricate, safe to use and require a minimum of maintenance.

A primary object of the invention is to simplify the construction as well as the means and mode of operation of platform type hand trucks whereby such trucks may not only be economically manufactured but will be more efficient and satisfactory in use, adaptable to a wide variety of applications and unlikely to create maintenance problems.

A further object of the invention is to provide a platform type hand truck which includes a fixed bed adapted for secure stacking of merchandise thereon.

Another object of the invention is to provide an improved platform type hand truck having a bed plate with a central depression to increase stability of merchandise stacked thereon.

An additional object of the invention is to provide an improved platform type hand truck which can be easily nested.

Another object of the invention is to provide a platform type hand truck such as is used in grocery warehouses and the like having a fixed bed plate which is inclined, centrally depressed and longitudinally tapered.

A further object of the invention is to provide an improved platform type hand truck which is simple as to component structure, safe to use, and easy to manipulate.

A further object of the invention is to provide a platform type hand truck having an improved fixed bed plate and means connected thereto adapted to simply and safely increase its capacity.

A further object of the invention is to provide an improved platform type hand truck which can be safely and easily employed to maximum advantage using unskilled labor.

Another object of the invention is to provide a platform type hand truck possessing the advantageous structural features, the inherent meritorious characteristics, and the mode of operation herein mentioned.

With the above primary and other incidental objects in view which will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein is shown one but obviously not necessarily the only form of embodiment of the invention, FIG. 1 is a perspective view of a platform type hand truck in accordance with the invention;

FIG. 2 illustrates the truck of FIG. 1 stored in nested relation;

FIG. 3 is a sectional view taken on line 3—3 of FIG. 1;

FIG. 4 is a view similar to that of FIG. 1 showing a capacity increasing frame attached to the device of FIG. 1 in normal operative position, and also turned upwardly relative the bed plate of the truck for nesting;

FIG. 5 is a perspective detail view of the capacity increasing frame taken from its underside; and FIG. 6 is a fragmentary detail view of the hinge connection between the capacity increasing frame and the truck frame.

Like parts are indicated by similar characters of reference throughout the several views.

The invention can best be described with reference to the preferred embodiment shown in the drawings. The improved hand truck consists of a longitudinally tapered frame 1 rectangularly expanded at the head end 2 to provide laterally projecting portions 3. The transversely extending members of frame 1 are centrally depressed to provide an expanded V-shape thereto as shown in FIG. 3 of the drawings. Bifurcated brackets 4 in depending relation to the frame 1 at each end and at its respective lateral extremities serve to rotatably mount wheels 5 to provide a mobile support for the frame. A floor or bed plate 7 is fixed in covering relation to the frame 1 coextensive therewith. The bed plate is centrally depressed at 8 along its longitudinal axis to provide a V-shaped cross section thereto conforming to that of frame 1. The plate 7 is also longitudinally tapered in symmetrical fashion from its head end to its outer end 9. The brackets 4 are so dimensioned that the mounting of the wheels 5 disposes the outer end 9 of the bed plate 7 lower than its head end. Thus, the plate 7 so mounted is both longitudinally tapered and relatively depressed from its head end.

Fixed on the upper surface of the plate 7 at the head end thereof is a right angled element providing a bumper 10.

Tubular brackets 11 are fixed to the frame 1 at its head end to mount vertically and support an upwardly extending inverted U-shaped handle bar 12 having a reinforcing rod 13 connecting the legs thereof.

As seen in FIG. 4 of the drawings, in overlying relation to the bed plate 7 is a frame 14. The frame 14 includes a pair of generally parallel relatively vertically disposed side plates 15 having their inner ends pivoted on bolts 17 projecting outwardly from the lateral extremities of the projecting portions 3 at the head end of the frame 1. The plates 15 have outermost end portions 16 which are slightly convergent and transversely connected at their convergent extremities by a plate 18 which is slightly V-shaped in elevation. The plates 15, 16 and 18 have similar plates 15', 16' and 18' integral therewith at their uppermost edges and at right angles thereto which are mutually directed inwardly of the frame 14. At each side of the frame 14 are elongated plates 19 in overlying relation to frame members 15' and 16' respectively. The relatively adjacent side edges of plates 19 are spaced, generally parallel and project toward each other over the frame 14. Plates 19 are so arranged as to extend longitudinally from adjacent the pivoted ends of plates 15 and to have their outer ends seat over the transverse plate 18. The outermost edge portions of the plates 19 converge similarly to plate portions 16.

The frame 14 is hinged to have the most adjacent edge portions of the plates 19 overlie the bed plate 7 at its outer side edges while the plate 18' overlies the outer end of the bed plate. The effect of the frame 14 is to laterally expand the bed surface of the truck. The plates 15 are spaced outwardly of the sides of the frame 1 and pairs of transversely aligned longitudinally spaced right angled spacer plates 20 fixed to the undersides of the plates 19 and 15' maintain the spacing. This prevents shifting of the frame 14 relative to the frame 1.

As can be seen from the drawings, frame 14 may be selectively hinged upwardly from the bed plate to lie against the handle bar 12. This serves two purposes. It provides for reducing the capacity of the truck and enables nesting of such trucks as shown in FIG. 2 of the drawings.

The basic truck thus provided enables articles to be stacked on its bed plate so as to be inclined toward its longitudinal center. This eliminates the common problem of stacked articles falling off the conventional platform truck during its movement. Thus, more stable and secure loading of a truck results from the use of the invention which enables a greater degree of vertical stacking. Also the provision of the connected frame 14 provides means whereby the truck capacity can be simply and effectively altered in an instant without need for involved manipulations. Moreover, the capacity adjusting means is safe to handle. When the frame 14 is seated to the bed plate there is a stable condition since it will not shift or disrupt the balance of merchandise on the truck. In this manner the invention provides platform type hand trucks with a great deal of adaptability without complexity of structure.

The inclination of the bed plate 7 and its longitudinal taper in conjunction with the fact that its head end is elevated with respect to its outer end enables similar trucks to be nested. The frames 14 are lifted and the elevated head end of one truck may be backed over the depressed narrow outer end of another truck.

It has been particularly pointed out herein that the invention is particularly advantageous in creating a highly improved and highly efficient platform type hand truck. New concepts are thereby injected in the art in question.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A platform type hand truck including means defining an upper surface thereof inclined downwardly to its longitudinal center line, means supporting said upper surface causing it to be inclined from one end to the other, said upper surface being tapered from one end to the other and frame means connected to one end of the truck including a pair of plate elements for selective generally vertical disposition thereon or disposition on peripheral portions of said means defining the upper surface to form a peripheral extension thereof.

2. A platform type hand truck including a single plate defining its upper surface inclined downwardly to its longitudinal center line, means supporting said plate causing it to be inclined from one end to the other, said plate being tapered from one end to the other and frame means connected to one end of the truck including plate elements for selective disposition vertically of its upper surface or on peripheral portions of said single plate to form peripheral extensions thereof.

3. A portable platform type hand truck including, a frame having outer and head ends, means mounting said frame in low slung relation to the floor elevating its head end relative its outer end, a bed plate on said frame providing an upper surface tapering from said head end to the outer end and extending laterally in upwardly inclined divergent planes from the longitudinal center line thereof, an upright handle on said frame at its head end, a bumper generally vertical of said bed plate outwardly of said handle, and an open frame pivoted to one end of said frame adapted for generally vertical or horizontal disposition relative said bed plate, said second frame including a pair of plates relatively inclined to seat on said bed plate at peripheral portions to form lateral extensions thereof.

4. A platform type hand truck including a mobile frame having a platform thereon providing it with a continuous upper surface, means provided on said surface for inclining articles vertically stacked thereon to its longitudinal center line, a bumper means to one end of said frame, said frame having rectangularly formed laterally projected portions to one end and being tapered to its opposite end, wheel means in supporting relation to said frame longitudinally inclining said platform and means connected for selectively effecting a lateral extension of said continuous surface.

5. A platform type hand truck including mobile support means having a bed plate forming its uppermost surface, said surface extending laterally in upwardly inclined divergent planes said bed plate being generally coextensive with said support means, frame elements hinged to one end of said support means including laterally spaced plate portions adapted to overlie peripheral portions of said bed plate in planes generally parallel thereto and relatively project to form substantially extensions of said uppermost surface.

6. A platform type hand truck comprising, a first frame having a portable mount orienting it in a generally horizontal position, a bed plate generally coextensive with said frame providing a continuous upper surface on said truck, said bed plate being oriented in a substantially horizontally extending position thereby, and an open frame connected for displacement to and from said bed plate, the inner peripheral portions of which seat to peripheral portions of said bed plate and the outer peripheral portions of which project to define a substantial expansion of said upper surface when said frame is displaced to said bed plate.

7. A platform type hand truck comprising, a first frame, means mounting said frame for movement in a generally horizontal position, a bed plate generally coextensive with said frame providing the upper surface of said truck, said bed plate being disposed in a generally horizontally extended position thereby, a pair of laterally spaced plates connected for displacement to and from said bed plate, the inner adjacent edge portions of which are adapted to seat to peripheral portions of said bed plate and the outermost peripheral portions of which are adapted to project outwardly to provide a substantial expansion of said upper surface.

References Cited in the file of this patent

UNITED STATES PATENTS

| | | |
|---|---|---|
| D. 157,442 | Schwartzman et al. | Feb. 21, 1950 |
| 335,359 | Jacobs | Feb. 7, 1886 |
| 552,380 | Linnell | Dec. 31, 1895 |
| 639,338 | Barns | Dec. 19, 1899 |
| 1,104,697 | Morrell | July 21, 1914 |
| 1,501,280 | Hinshaw | July 15, 1924 |
| 1,527,419 | Leonard | Feb. 24, 1925 |
| 1,837,927 | Travis | Dec. 22, 1931 |
| 1,948,206 | Earle et al. | Feb. 20, 1934 |
| 2,393,692 | Katzman | Jan. 29, 1946 |
| 2,513,604 | Vandemark | July 4, 1950 |
| 2,544,743 | Vrabcak | Mar. 13, 1951 |
| 2,590,048 | Sides | Mar. 18, 1952 |
| 2,738,201 | Spears | Mar. 13, 1956 |
| 2,764,419 | Enders | Sept. 25, 1956 |
| 2,818,267 | Watson | Dec. 31, 1957 |
| 2,833,550 | Frick | May 6, 1958 |